United States Patent [19]
Barker et al.

[11] Patent Number: 5,772,702
[45] Date of Patent: Jun. 30, 1998

[54] METHOD OF PREPARING ELECTROCHEMICAL CELLS

[75] Inventors: Jeremy Barker; J. Lee Morris; Frederik Flemming; Wade W. Guindy, all of Henderson, Nev.

[73] Assignee: Valence Technology, Inc., Henderson, Nev.

[21] Appl. No.: 630,315

[22] Filed: Apr. 10, 1996

[51] Int. Cl.$^6$ .................................................. H01M 10/38
[52] U.S. Cl. ........................ 29/623.1; 29/623.3; 29/623.5
[58] Field of Search ............................. 29/623.1, 623.3, 29/623.5, 192

[56] References Cited

U.S. PATENT DOCUMENTS

| | | | |
|---|---|---|---|
| 4,925,751 | 5/1990 | Shackle et al. | 429/191 |
| 5,316,556 | 5/1994 | Morris | 29/623.3 |
| 5,460,904 | 10/1995 | Gozdz et al. | 429/192 |
| 5,540,741 | 7/1996 | Gozdz et al. | 29/623.5 |

*Primary Examiner*—Anthony Skapars
*Attorney, Agent, or Firm*—Charles Jew

[57] ABSTRACT

A method of fabricating electrochemical cells wherein precursors thereof can be stored for extended periods of time following extraction of plasticizer therefrom to form porous structures in the polymeric layer and the polymer binder materials of the anode and cathode is provided. Electrochemical cells are produced when the precursors are activated by the addition of an electrolyte solvent and salt.

18 Claims, 4 Drawing Sheets

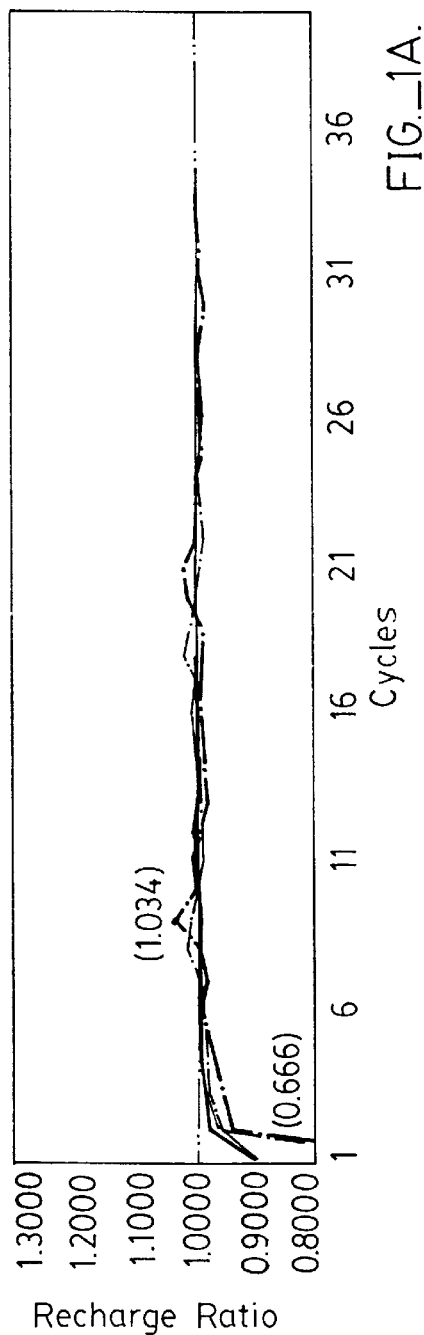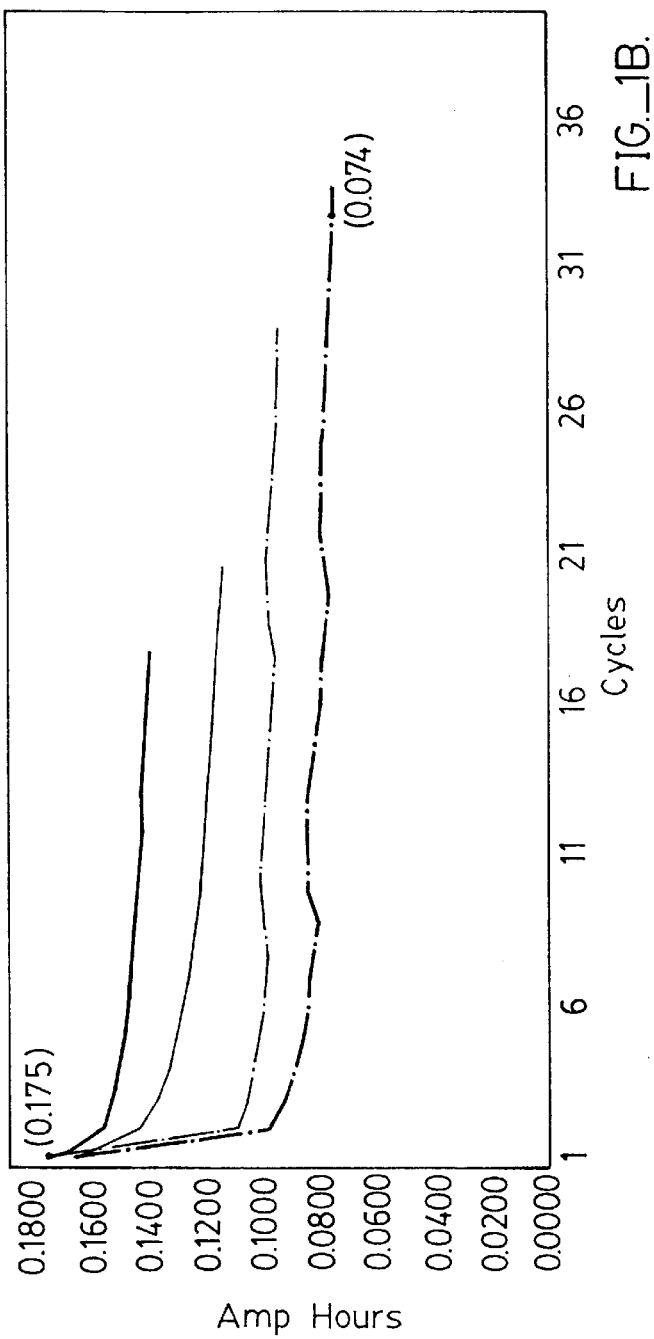

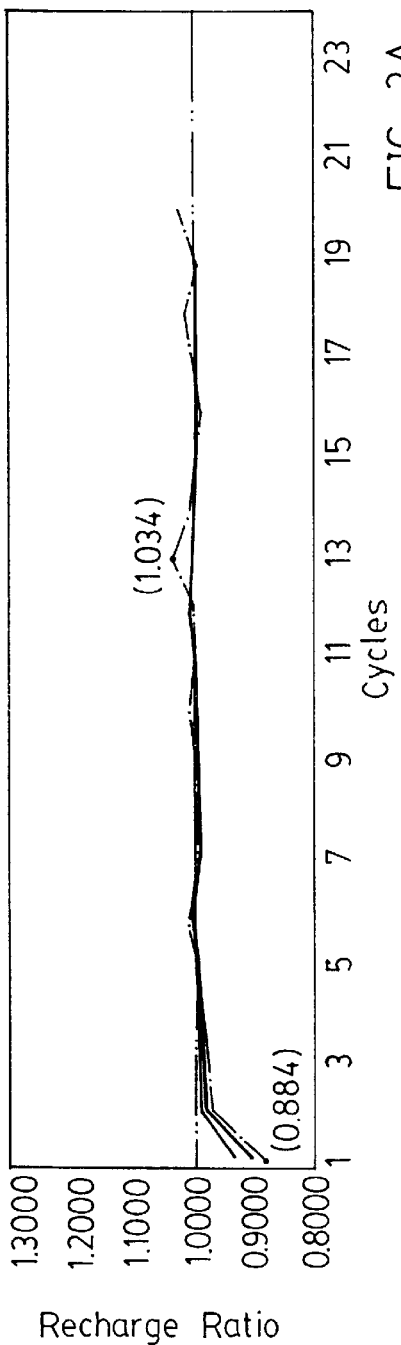
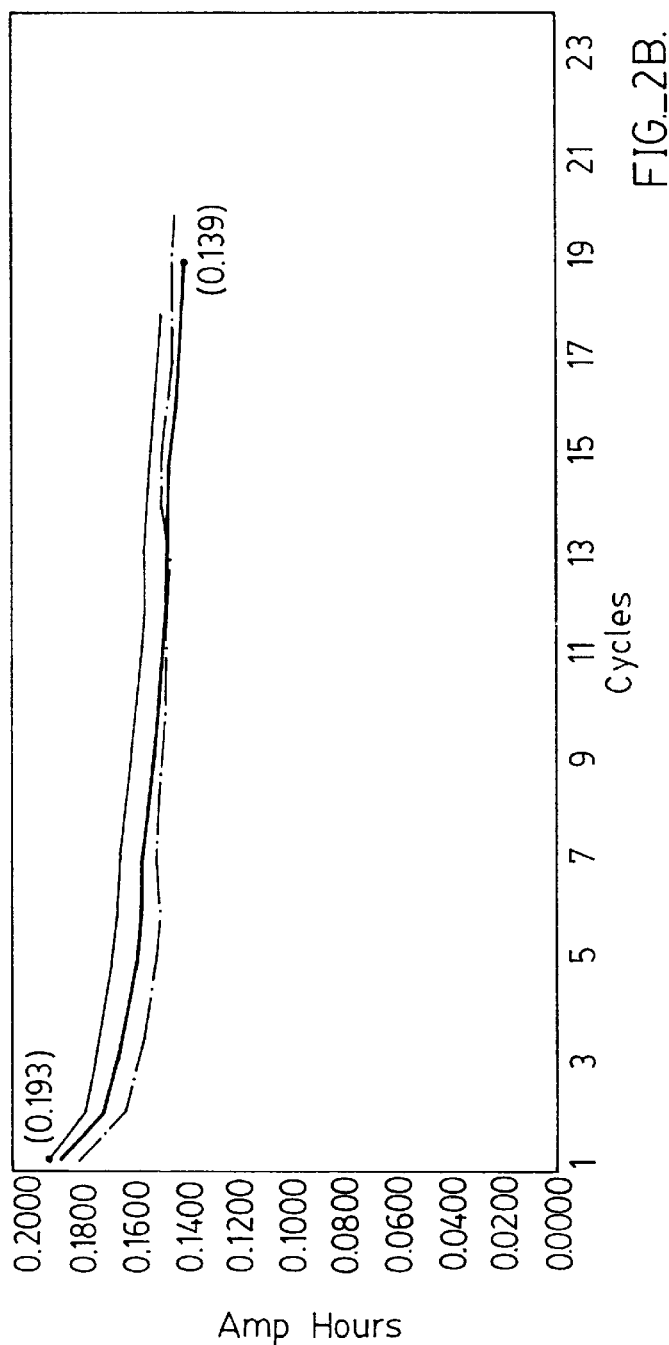

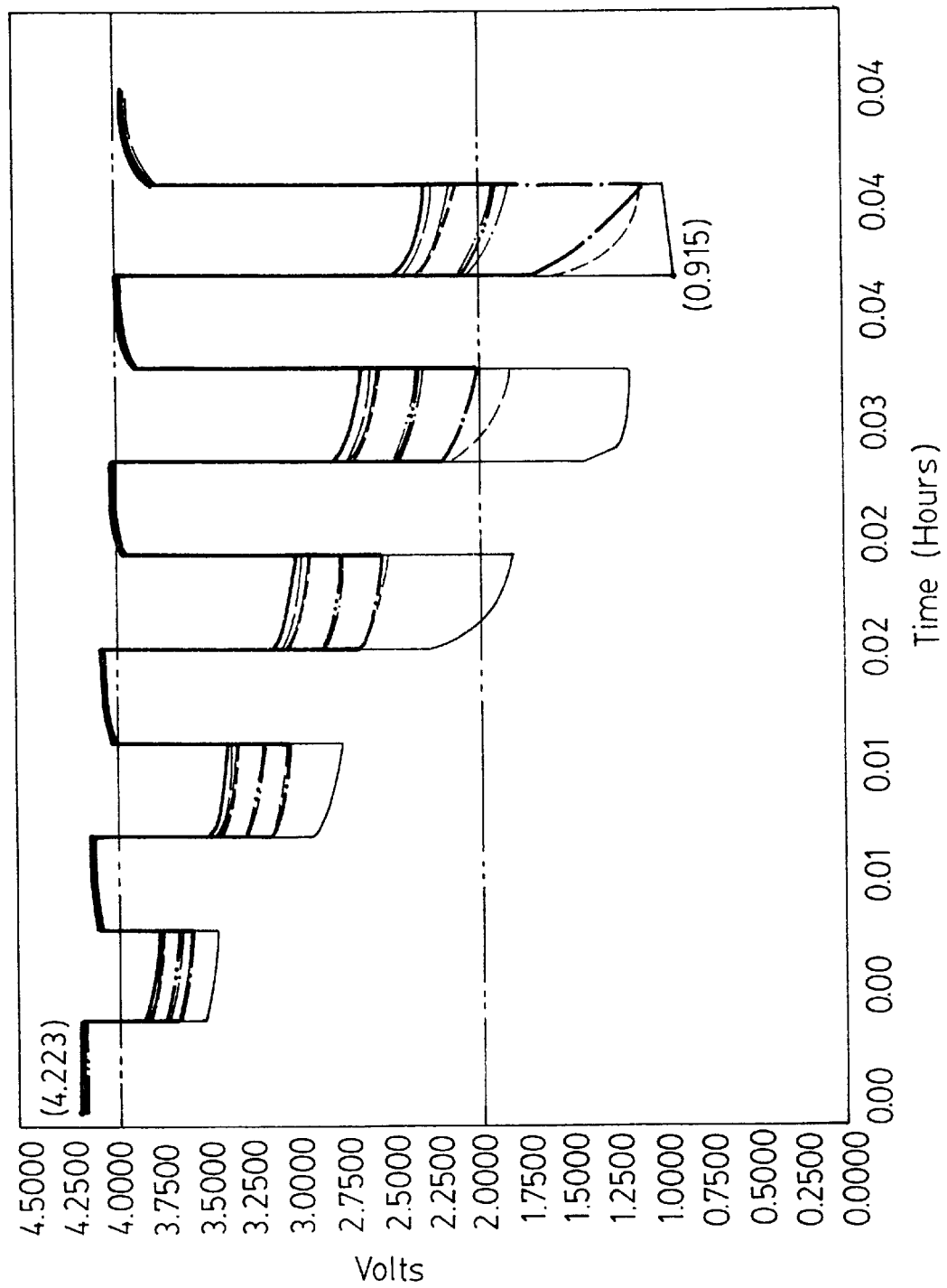
FIG._3.

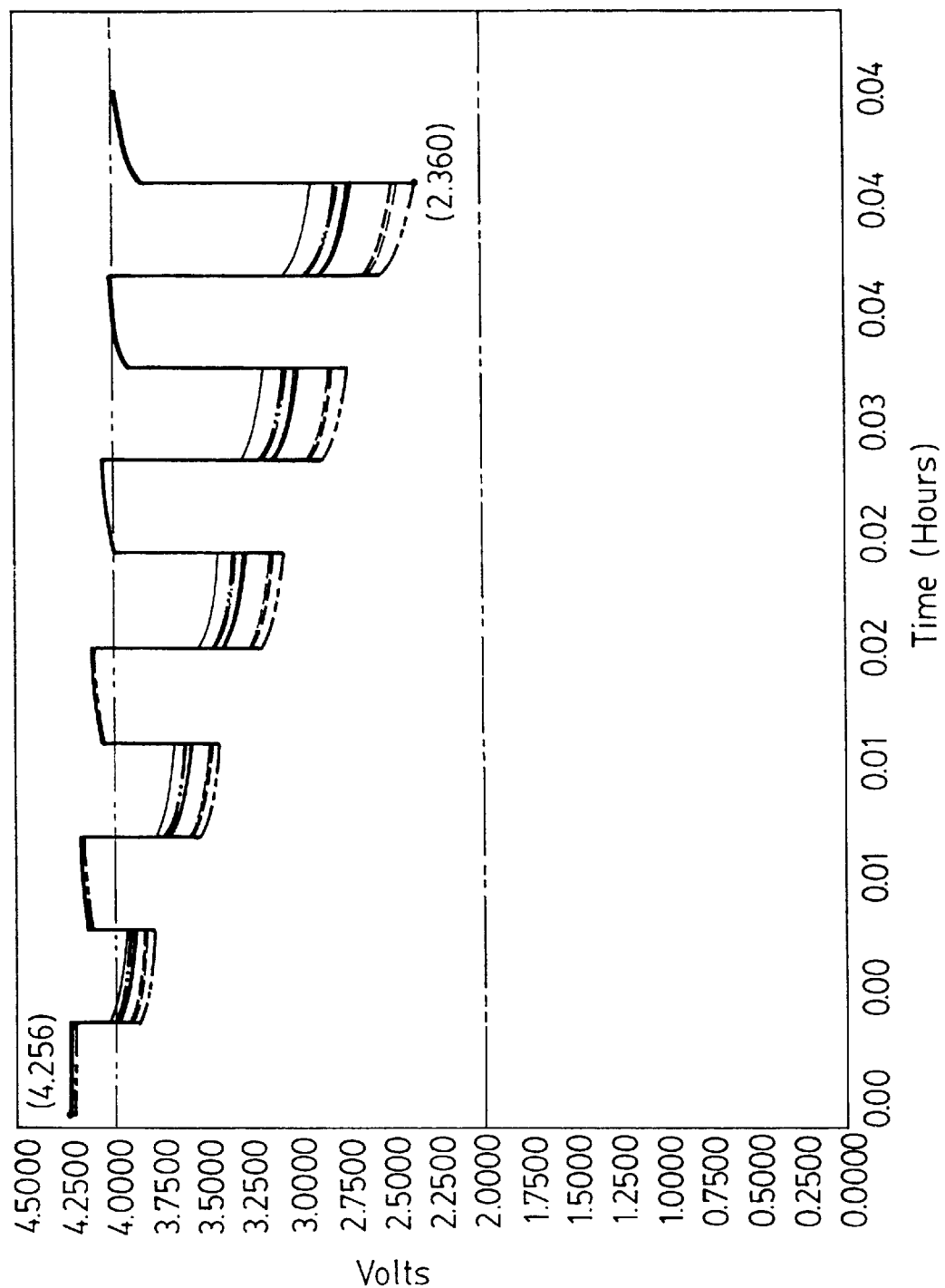
FIG._4.

METHOD OF PREPARING ELECTROCHEMICAL CELLS

FIELD OF THE INVENTION

The present invention relates to electrochemical devices and, more particularly, to a method of fabricating, non-aqueous electrochemical cells demonstrating improved performance.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC_6$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668,595 and 5,028,500.

Various factors influence the performance of electrochemical cells. For instance, the morphology of the polymeric matrix and of the polymeric binders in the anode and/or cathode can affect conductivity of the salts. Improved conductivity has been demonstrated by employing porous polymeric matrices and polymeric binders. One method of producing such porous structures comprises forming polymeric structures in the presence of a plasticizer; upon removal of the plasticizer, pores are created in the polymer. Plasticizers can comprise up to about 50 percent of the weight of an electrochemical cell precursor prior to their removal. Current methods of removing these solvents include extraction wherein the separating agent is another organic liquid solvent such as dimethyl ether, methanol, and cyclohexane. Typically, in assembling an electrochemical cell, an electrolyte solution comprising an electrolyte solvent and salt is added to activate the electrochemical cell precursor shortly after removing the plasticizer. The above process is suited for laboratory scale production but not for mass production of electrochemical cells.

SUMMARY OF THE INVENTION

The present invention is based in part on the discovery that electrochemical cell precursors can be stored for considerable periods of time following the removal of the plasticizers before being activated without any significant loss of electrochemical performance of the cell. It is expected that electrochemical cell precursors can be stored up to 30 days or longer before being activated.

In one aspect, the invention is directed to a method of preparing an electrochemical cell comprising the steps of:

(a) preparing an anode precursor by forming an anode film comprising a carbon, a first polymeric binder, and a first plasticizer and thereafter extracting said first plasticizer;

(b) preparing a cathode precursor by forming a cathode film comprising a cathodic material, a second polymeric binder, and a second plasticizer and thereafter extracting said second plasticizer;

(c) preparing an polymeric electrolyte precursor by forming a polymeric matrix comprising a third plasticizer and thereafter extracting said third plasticizer;

(d) storing said anode precursor, said cathode precursor, and said polymeric electrolyte precursor; and (e) activating said anode precursor, said cathode precursor, and said polymeric electrolyte precursor, wherein said polymeric precursor is interposed between said anode precursor and said cathode precursor.

In another aspect, the invention is directed to a method of preparing an electrochemical cell comprising the steps of:

(a) forming an anode film comprising a polymeric matrix and a first plasticizer;

(b) forming a cathode film comprising a polymeric binder and a second plasticizer;

(c) forming a polymeric layer comprising a third plasticizer;

(d) interposing said polymeric layer between said anode film and said cathode film and thereafter extracting said plasticizers therefrom to form an electrochemical cell precursor;

(e) storing said electrochemical cell precursor; and (f) activating said electrochemical cell precursor to form an electrochemical cell.

In yet another aspect, the invention is directed to a method of preparing an electrochemical cell comprising the steps of:

(a) preparing an anode precursor by forming an anode film comprising a carbon, a first polymeric binder, and a first plasticizer and thereafter extracting said first plasticizer;

(b) preparing a cathode precursor by forming a cathode film comprising a cathodic material, a second polymeric binder and a second plasticizer and thereafter extracting said second plasticizer;

(c) preparing an polymeric electrolyte precursor by forming a polymeric matrix comprising a third plasticizer and thereafter extracting said third plasticizer; and (d) activating said anode precursor, said cathode precursor, and said polymeric electrolyte precursor, wherein the polymeric electrolyte is interposed between said anode precursor and said cathode precursor and wherein said anode precursor, said cathode precursor, or polymeric electrolyte precursor was stored prior to being activated.

A feature of the invention is that anode and cathode current collectors that are employed to fabricate the anode and cathode, respectively, preferably should not be exposed to oxygen for any significant period of time (e.g., overnight) prior to lamination with the anode and cathode material. Excessive exposure results in reduced electrochemical performance of the cell. It is believed that oxygen oxidizes the metal to cause a partially electrically insulating film to develop on the current collector.

BRIEF DESCRIPTION OF THE DRAWINGS

FIGS. 1A and 1B and 2A and 2B graphically illustrate the recharge ratio and discharge capacity ratio, respectively vs. cycle number for electrochemical cells.

FIGS. 3 and 4 are the pulse test profiles of voltage vs. time for electrochemical cells.

DETAILED DESCRIPTION OF THE PREFERRED EMBODIMENTS OF THE INVENTION

The present invention is directed to a method of preparing electrochemical cells. One important feature of the invention is that electrochemical cell precursors (and components thereof) can be stored for considerable lengths of time before activation. Electrochemical cells or batteries so fabricated do not exhibit any significant deterioration in electrochemical performance. This result is achieved in part by removing the plasticizer from the precursors prior to storage. Preferred cells include: a cathode comprising an active cathodic material, an intercalation based carbon anode, with each electrode capable of reversibly incorporating (e.g., intercalating) an alkali metal ion, and a polymeric matrix containing an electrolyte solution comprising an organic electrolyte solvent and a salt of the alkali metal. Each electrode has a current collector. Particularly preferred electrochemical cells and batteries use lithium and salts thereof.

The anode of the present invention generally comprises an anode film that is laminated onto one or both sides of the current collector which is a thin metal foil or grid. Typically, each anode film is from about 100 μm to about 250 μm in thickness, preferably about 110 μm to about 200 μm, and more preferably about 125 μm to about 175 μm Similarly, the cathode of the present invention generally comprises a cathode film that is laminated onto one or both sides of the cathode current collector which is a thin metal foil or grid. Typically, each cathode film is from about 100 μm to about 200 μm in thickness, preferably about 130 μm to about 175 μm, and more preferably about 140 μm to about 165 μm.

The anode and cathode each also includes a current collector that comprises, for example, a screen, grid, expanded metal, woven or non-woven or knitted wire fabric formed from an electron conductive material such as metals or alloys. Preferably, the current collector has a thickness from about 25 μm to about 75 μm, preferably about 35 μm to about 65 μm, and more preferably about 45 μm to about 55 μm. Each current collector is also connected to a current collector tab which extends from the edge of the current collector. In batteries comprising multiple electrochemical cells, the anode tabs are preferably welded together and connected to a lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability liquid solvents (e.g., diethyl ether) or by dense gases for example. Preferred plasticizers include, for example, dibutyl phthalate, dioctylphthalate, and acetates, glymes, and low molecular weight polymers.

In operation, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solvent. The precursor typically comprises (each in precursor form) an anode, a cathode, and polymeric matrix. The anode and/or cathode may each include a current collector. The polymeric matrix can function as a separator between the anode and cathode.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and polymeric layer comprising an electrolyte solution interposed therebetween. The polymeric layer can function as a separation layer.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. The solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as a polymeric layer in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of vinylidenedifluoride and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon and/or graphite, the electrolytic solvent preferably comprises a mixture of ethylene carbonate and dimethyl carbonate.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one ; andspiro(1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$ and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

METHODOLOGY

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive method can be adapted to form anode, cathode, and/or polymeric matrix structures in prior art electrochemical cells. The following illustrates a method of how an electrolytic cell could be fabricated with the inventive process. Examples 1 and 2 describe the process of preparing the anode slurry and cathode slurry, respectively. Example 3 describes the procedures for fabricating a solid electrolytic cell.

The invention will be described using the anode and cathode structures wherein electrode materials (or films) are laminated onto both sides of the current collectors, however, it is understood that the invention is applicable to other configurations, for example, where one side of the anode and/or cathode current collector is laminated.

EXAMPLE 1

The anode current collector employed was a sheet of expanded copper metal that is about 50 $\mu$m thick. It is available under the designation 2Cu5-125 (flatten) from Delker Corp., Branford, Conn.

The anode slurry was prepared as follows:

A polymer mixture comprising a copolymer of vinylidenedifluoride (VDF) and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif. model H-04172-00. The copolymer functions as a binder for the carbon in the anode.

A graphite mixture was prepared separately by first adding 23.4 grams of graphite into 0.9 grams of carbon black into a solution containing 60 grams acetone, and 10.5 grams dibutyl phthalate. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willebroek, Belgium. (Optionally, about 0.5 grams of a surfactant such as Pluronic FC68™ from BASF, Mt. Olive, N.J. and Flurad 430™ from 3M Co. St. Paul, Minn. can be added to the graphite mixture to help disperse the graphite. The graphite mixture was then vigorously mixed in a high shear mixer until a substantially homogeneous blend was formed. A suitable mixer is available from Ross Model ME100DLX, Hauppauge, N.Y., operating at its highest setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed was a sheet of expanded aluminum that is about 50 $\mu$m thick. The aluminum grid is available under the designation 2AL5-077 from Delker Corp.

The cathode slurry was prepared as follows:

A polymer mixture comprising a copolymer of vinylidenedifluoride (VDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by first adding 28.9 grams of a cathode-active material comprising $Li_xMn_2O_4$ (spinel) ($0 \leq x < 2$), 2.4 grams of carbon black (Super P™) into a solution containing 60 grams acetone, and 8.7 grams dibutyl phthalate. The mixture was then vigorously mixed in the a high shear mixer until a substantially homogeneous blend was formed. (Optionally, about 0.5 grams of a surfactant can be added to the cathode mixture.)

The cathode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell precursor is prepared by positioning a polymeric matrix between the anode and cathode and thereafter laminating the structures under moderate pressure and/or temperature (e.g., 130° C.). The pressure and temperature employed will depend on the polymer (s) forming the matrix. The polymeric matrix is formed by casting a slurry comprising acetone, dibutyl phthalate, silanized fumed $SiO_2$, and a VDF/HFP copolymer onto a carrier web or other substrate and allowing the acetone to evaporate. No curing by radiation is required. The $SiO_2$ is a filler which imparts toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the slurry is mixed under low shear conditions as not to degrade the copolymer. The anode, cathode, and separator films can be prepared separately or each can be fabricated in the form of a long web and stored as individual rolls. Each web can be cut to size as needed.

Next the dibutyl phthalate is extracted from the precursor or plurality of electrochemical cell precursors in the case of a battery. Extraction can be accomplished using conventional organic liquid solvents such as diethyl ether or by a supercritical fluid which includes, for example, a gas compressed and heated to either supercritical or subcritical conditions to achieve liquid-like densities. Supercritical fluids are known in the art. See, for example, U.S. Pat. Nos. 5,013,366, 5,267,455, 4,219,333, 4,012,194, and 3,969,196, which are incorporated herein. A preferred supercritical fluid is carbon dioxide.

Following extraction, the precursor is then packaged in moisture-impermeable material which is described, for example, in U.S. Pat. No. 5,326,653 which is incorporated herein. The precursor is then activated. Extraction and activation preferably take place in an inert (e.g., argon) atmosphere. Finally, the packaging is sealed.

A critical aspect of the present invention is that the electrochemical cell precursor (and the individual anode, cathode, and/or polymeric electrolyte percursor(s)) following extraction of the plasticizer can be stored for a considerable period of time before being activated. At a minimum, the precursors can be stored for 20 hours. In contrast, it has been found that electrochemical cells, fabricated from precursors that have been stored for this length of time with the plasticizers remaining therein, demonstrate poor electrochemical performance.

Generally, the electrochemical cell precursor will be stored in the assembled configuration, that is, it includes the anode, cathode, and polymeric layer precursors. However, it is understood that, the individual components can be stored separately and then assembled prior to activation. In assembling the components, the anode precursor, cathode precursor, and polymeric electrolyte precursor are preferably fused together by the application of moderate pressure and heat (e.g., 130° C.) to cause the polymeric components of the anode and cathode precursors to adhere to the polymeric layer. Furthermore, not all the precursor components need be stored prior to use.

One advantage of the invention is that electrochemical cell precursors without the plasticizers weigh less and therefor can be easily transported. With prior art methods, storage of the precursors with the plasticizers remaining therein for any significant period of time is believe to cause degradation of one or more components of the electrochemical cells. With the present invention, electrochemical cell precursors (or precursors of the individual components) can be stored for longer than about 2 hours and up to 3 months and more. Preferably, the electrochemical cell precursors are stored between about 20 hours to about 4 weeks before being activated.

It has been demonstrated that electrochemical cell precursors or percursors of components thereof (following removal of the plasticizer) which have been stored for about 30 days can still produce electrochemical cells with good electrochemical performance upon activation. If precursors are placed in a controlled environment that has low $O_2$ and $H_2O$ contents (and preferrably essentially $O_2$ and $H_2O$ free), said precursors can be stored for about 8–13 weeks or longer prior to activation without significant reduction in performance.

EXPERIMENTAL

Electrochemical cells were fabricated in accordance with the above procedure wherein the electrochemical cell precursors were stored with and without the plasticizer therein. Specifically, a first set of cells was fabricated wherein each electrochemical cell precursor, which included the anode, cathode, and polymeric layer, was stored for about 24 hours with the plasticizer (i.e., dibutyl phthalate DBP) remaining therein. Subsequently, the plasticizer was extracted from the cell and activated. For comparison, a second set of cells was fabricated wherein the electrochemical cell precursors were stored for 24 hours without the plasticizer, that is, the plasticizer was extracted once the cell precursors were assembled. After storage, the precursors were activated. The anode, cathode, and polymeric layer of the electrochemical cells each had a surface area of about 48 cm$^2$.

In general, in fabricating the anode, cathode, and polymeric matrix of the second set of cells, the plasticizer (DBP) was extracted from the anode film, cathode film, and polymeric matrix film, respectively, within about 0.5–2 hours from the time that the particular slurry was casted. In this fashion, for the second set of cells, the plasticizer did not remain in the anode, cathode, or polymeric matrix precursor component of the cell for any significant length of time prior to storage.

For both sets of cells, the anode and cathode current collectors were etched prior to being laminated with the anode or cathode slurry. The aluminum cathode current collectors were placed in a 1M KOH methanol solution for about 30 minutes. Thereafter, the aluminum was washed with water, rinsed with acetone, and allowed to dry. The etching removes surface oxides from the aluminum. The copper anode current collectors were placed in a 1M $HNO_3$ aqueous solution for 30 minutes. Thereafter, the copper was washed with water, rinsed with acetone, and allowed to dry. The etching causes formation of pits on the copper surface which improves the adhesion of the anode film.

The recharge ratios and discharge capacities for these electrochemical cells were measured at different discharge and charge currents. For each test, the voltage limits were 2.5 volts and 4.5 volts. FIGS. 1A and 1B depict the recharge ratio and discharge capacity, respectively vs. cycle numbers for four electrochemical cells which were fabricated from electrochemical cell precursors that were stored with the plasticizer therein prior to activation.

FIGS. 2A and 2B depict the recharge ratio and discharge capacity, respectively vs. cycle number for three electrochemical cells which were fabricated from electrochemical cell precursors that were stored without the plasticizer. In each case, the discharge rate was 1mA/cm$^2$ and the charge rate was 1 mA/cm$^2$. As is apparent, the electrochemical cells fabricated from precursors that did not contain plasticizer during storage exhibited superior discharge capacities relative to cells fabricated from precursors that were stored with the plasticizer.

The two sets of electrochemical cells were also subject to pulse testing employing a Maccor battery cycler manufactured by Maccor, Inc. Tulsa OK. Pulses of direct current at densities of 4,8,12,16, and 20 mA/cm$^2$ were sequentially applied across fully charged cell for 15 seconds. Between pulses there was a 15 second interval at open circuit before a higher current pulse was applied. The voltage of each cell was measured and a high cell voltage during each of the current pulses demonstrates good performance. When a current is applied to a charged electrochemical cell, the voltage will exhibit a precipitous decrease. The magnitude of this voltage drop is proportional to the internal impedence of the cell. After applied current is removed, the cell voltage returns almost to the initial voltage level.

The voltage vs. time profiles measured during pulse testing for ten electrochemical cells which were fabricated from precursors that were stored with the plasticizer therein are depicted in FIG. 3. For comparison, the voltage vs. time profiles for nine electrochemical cells which were fabricated from precursors that were stored without the plasticizer are depicted in FIG. 4. As is apparent, electrochemical cells fabricated by the inventive method exhibit superior performance, e.g. has less internal impedance. Indeed, if a 2.3 V cut-off criterion is used, all the electrochemical cells depicted in FIG. 3 (i.e.,those that were fabricated from cell precursors stored with plasticizer) therein failed at 20 mA/cm$^2$ but all the cell fabricated with the inventive method passed.

Another factor which influences electrochemical cell performance is the length of time the etched current collector is exposed to moisture and/or the atmosphere prior to being laminated with the anode or cathode slurry. To demonstrate this phenomenon, a group of electrochemical cells were fabricated wherein the current collectors were laminated within 1 hour following etching. Furthermore, the electrochemical cells produced were derived from: (1) electrochemical cell precursors that were not stored prior to extraction and activation; (2) precursors that were stored following extraction, without the plasticizer, for about 24 hours prior to activation and (3) precursors that were stored, with the plasticizer, for about 24 hours prior extraction and activation. The AC impedance of cells in each category was measured after activation and set forth in Table 1. A low impedance level is indicative of superior performance. It can be seen that the cells stored without the plasticizer are substantially better than those stored with the plasticizer.

TABLE 1

| | Impedance Measurements (Ohms) (for 48 cm² cells) | | |
|---|---|---|---|
| | Cells not stored | Cells stored w/o DBP | Cells stored w/DBP |
| Current collector used within 1 hour of etching | 0.94 | 0.47 | 3.66 |
| | 0.39 | 0.60 | 1.22 |
| | 0.43 | 0.73 | 1.26 |
| | 0.33 | 0.46 | 1.52 |
| | 0.38 | 0.48 | 1.15 |
| | 0.57 | 0.42 | 2.25 |
| | 0.43 | 0.52 | 0.41 |
| | 0.49 | 0.42 | 1.32 |
| | | 0.28 | 1.57 |
| | | | 1.28 |
| Average. | 0.495 | 0.487 | 1.564 0.888 |
| Std. Deviation | 0.194 | 0.125 | 0.864 0.743 |

As is apparent, exposure of the etched current collector to open air increases the impedance. Thus, if current collectors are not laminated within a short period of time following etching, the collectors should be stored in vacuum or an inert atmosphere to possibly reduce or eliminate this adverse effect.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of preparing an electrochemical cell comprising the steps of:
   (a) preparing an anode precursor by forming an anode film comprising a carbon, a first polymeric binder, and a first plasticizer and thereafter extracting said first plasticizer;
   (b) preparing a cathode precursor by forming a cathode film comprising a cathodic material, a second polymeric binder, and a second plasticizer and thereafter extracting said second plasticizer;
   (c) preparing an polymeric electrolyte precursor by forming a polymeric matrix comprising a third plasticizer and thereafter extracting said third plasticizer;
   (d) following steps a–c, storing said anode precursor, said cathode precursor, and said polymeric electrolyte precursor for a period of time from 24 hours to about 4 weeks prior to activation; and
   (e) activating said anode precursor, said cathode precursor, and said polymeric electrolyte precursor, wherein said polymeric precursor is interposed between said anode precursor and said cathode precursor.

2. A method of preparing an electrochemical cell comprising the steps of:
   (a) forming an anode film comprising a polymeric matrix and a first plasticizer;
   (b) forming a cathode film comprising a polymeric binder and a second plasticizer;
   (c) forming a polymeric layer comprising a third plasticizer;
   (d) interposing said polymeric layer between said anode film and said cathode film;
   (e) extracting said plasticizers therefrom to form an electrochemical cell precursor;
   (f) following steps a–e, storing said electrochemical cell precursor for a period of time from 24 hours to about 4 weeks prior to activation; and
   (g) activating said electrochemical cell precursor to form an electrochemical cell.

3. A method of preparing an electrochemical cell comprising the steps of:
   (a) preparing an anode precursor by forming an anode film comprising a carbon, a first polymeric binder, and a first plasticizer and thereafter extracting said first plasticizer;
   (b) preparing a cathode precursor by forming a cathode film comprising a cathodic material, a second polymeric binder and a second plasticizer and thereafter extracting said second plasticizer;
   (c) preparing an polymeric electrolyte precursor by forming a polymeric matrix comprising a third plasticizer and thereafter extracting said third plasticizer; and
   (d) activating said anode precursor, said cathode precursor, and said polymeric electrolyte precursor, wherein the polymeric electrolyte is interposed between said anode precursor and said cathode precursor and wherein said anode precursor, said cathode precursor, or polymeric electrolyte precursor was stored for a period of time from 24 hours to about 4 weeks prior to being activated.

4. The method of claim 1 further comprising the step of fusing said polymeric electrolyte precursor to said anode precursor and to said cathode precursor prior to step (e).

5. The method of claim 2 further comprising the step of laminating said polymeric electrolyte precursor to said anode precursor and to said cathode precursor prior to step (e).

6. The method of claim 3 further comprising the step of fusing said polymeric electrolyte precursor to said anode precursor and to said cathode precursor prior to step (d).

7. The method of claim 1 wherein said anode film is laminated onto a surface of an anode current collector and wherein said cathode film is laminated onto a surface of a cathode current collector.

8. The method of claim 2 wherein said anode film is laminated onto a surface of an anode current collector and wherein said cathode film is laminated onto a surface of a cathode current collector.

9. The method of claim 3 wherein said anode film is laminated onto a surface of an anode current collector and wherein said cathode film is laminated onto a surface of a cathode current collector.

10. The method of claim 7 wherein said anode current collector surface was etched prior to being laminated with said anode film and wherein said cathode current collector surface was etched prior to being laminated with said cathode film.

11. The method of claim 8 wherein said anode current collector surface was etched prior to being laminated with said anode film and wherein said cathode current collector surface was etched prior to being laminated with said cathode film.

12. The method of claim 9 wherein said anode current collector surface was etched prior to being laminated with said anode film and wherein said cathode current collector surface was etched prior to being laminated with said cathode film.

13. The method of claim 1 wherein said first, second, and third plasticizers comprise dibutyl phthalate.

14. The method of claim 2 wherein said first, second, and third plasticizers comprise dibutyl phthalate.

15. The method of claim 3 wherein said first, second, and third plasticizers comprise dibutyl phthalate.

16. The method of claim 1 wherein said polymeric matrix and said first and second polymeric binders comprise a copolymer of vinylidenedifluoride and hexafluoropropylene.

17. The method of claim 2 wherein said polymeric matrix and said first and second polymeric binders comprise a copolymer of vinylidenedifluoride and hexafluoropropylene.

18. The method of claim 3 wherein said polymeric matrix and said first and second polymeric binders comprise a copolymer of vinylidenedifluoride and hexafluoropropylene.

* * * * *